(12) United States Patent
Feldman et al.

(10) Patent No.: US 12,686,293 B2
(45) Date of Patent: Jul. 21, 2026

(54) ELECTRIC VEHICLE (EV) DRIVER APPLICATION (APP) TO IDENTIFY A DRIVER CHARGING PROFILE FOR AUTOMATIC SELECTION IN A CHARGING SESSION

(71) Applicant: Siemens Industry, Inc., Alpharetta, GA (US)

(72) Inventors: Daniel Feldman, New York, NY (US); Konstantin Scholz, Schwaig bei Nürnberg (DE)

(73) Assignees: Siemens Industry, Inc., Alpharetta, GA (US); Siemens Aktiengesellschaft, Munich (DE)

( * ) Notice: Subject to any disclaimer, the term of this patent is extended or adjusted under 35 U.S.C. 154(b) by 16 days.

(21) Appl. No.: 18/740,628

(22) Filed: Jun. 12, 2024

(65) Prior Publication Data

US 2025/0381877 A1     Dec. 18, 2025

(51) Int. Cl.
B60L 53/66      (2019.01)
H04M 1/72412    (2021.01)

(52) U.S. Cl.
CPC ....... B60L 53/665 (2019.02); H04M 1/72412 (2021.01)

(58) Field of Classification Search
CPC ........................ B60L 53/665; H04M 1/72412
USPC ........................................................ 701/426
See application file for complete search history.

(56) References Cited

U.S. PATENT DOCUMENTS 9,848,457 B1 * 12/2017 Yae ....................... H04W 76/14
11,787,305 B2   10/2023 Feldman et al.

2011/0224852 A1   9/2011 Profitt-Brown et al.
2012/0049793 A1   3/2012 Ross et al.
2017/0129349 A1 * 5/2017 Solomon .................. G07C 9/21
2022/0055500 A1   2/2022 Feldman et al.
(Continued)

FOREIGN PATENT DOCUMENTS

DE     102022208200 A1 * 11/2023 ............. G06Q 50/40

OTHER PUBLICATIONS

Tsairi, Yaara, et al. "Policy Dissonance when wearing the 'employer hat': The practice of governmental vehicle reimbursement among public sector employees." Case Studies on Transport Policy, vol. 12, Mar. 25, 2023, p. 100997, https://doi.org/10.1016/j.cstp.2023. 100997. (Year: 2023).*

*Primary Examiner* — Peter D Nolan
*Assistant Examiner* — Hyang Ahn

(57) ABSTRACT

A system comprises an EV with an infotainment unit, a driver App, an electric mobility service provider (eMSP) cloud and a user charging profile database to identify a Bluetooth® and time/location-based driver charging profile for its automatic selection in a charging session. The driver App is configured to communicate with the infotainment unit via a Bluetooth® interface such that a Bluetooth® MAC address being assigned to each device connected to a network is used to identify a vehicle ID and a mobile device location is used as a proxy for a vehicle location. The eMSP cloud is configured to receive the vehicle ID and the vehicle location. The user charging profile database including user charging profiles. The driver App includes a Bluetooth® plus time-based profile automatic selector for a charging session to automatically select a proper user charging profile based on the MAC address plus a day/time/location-based pre-configuration.

14 Claims, 3 Drawing Sheets

Smartphone location user as proxy for vehicle location

User profile with different access rights/prices including vehicle, location and date/time Bluetooth MAC address used to identify vehicle

(56) References Cited

U.S. PATENT DOCUMENTS

| 2022/0228877 A1* | 7/2022 | Feldman | ............ | G01C 21/3476 |
| 2023/0206265 A1* | 6/2023 | Girija | ................ | G06Q 20/4016 |
| | | | | 705/7.35 |
| 2025/0326321 A1* | 10/2025 | Perrufel | ................ | B60L 53/65 |

* cited by examiner

Bluetooth and time/location-based driver profile selection

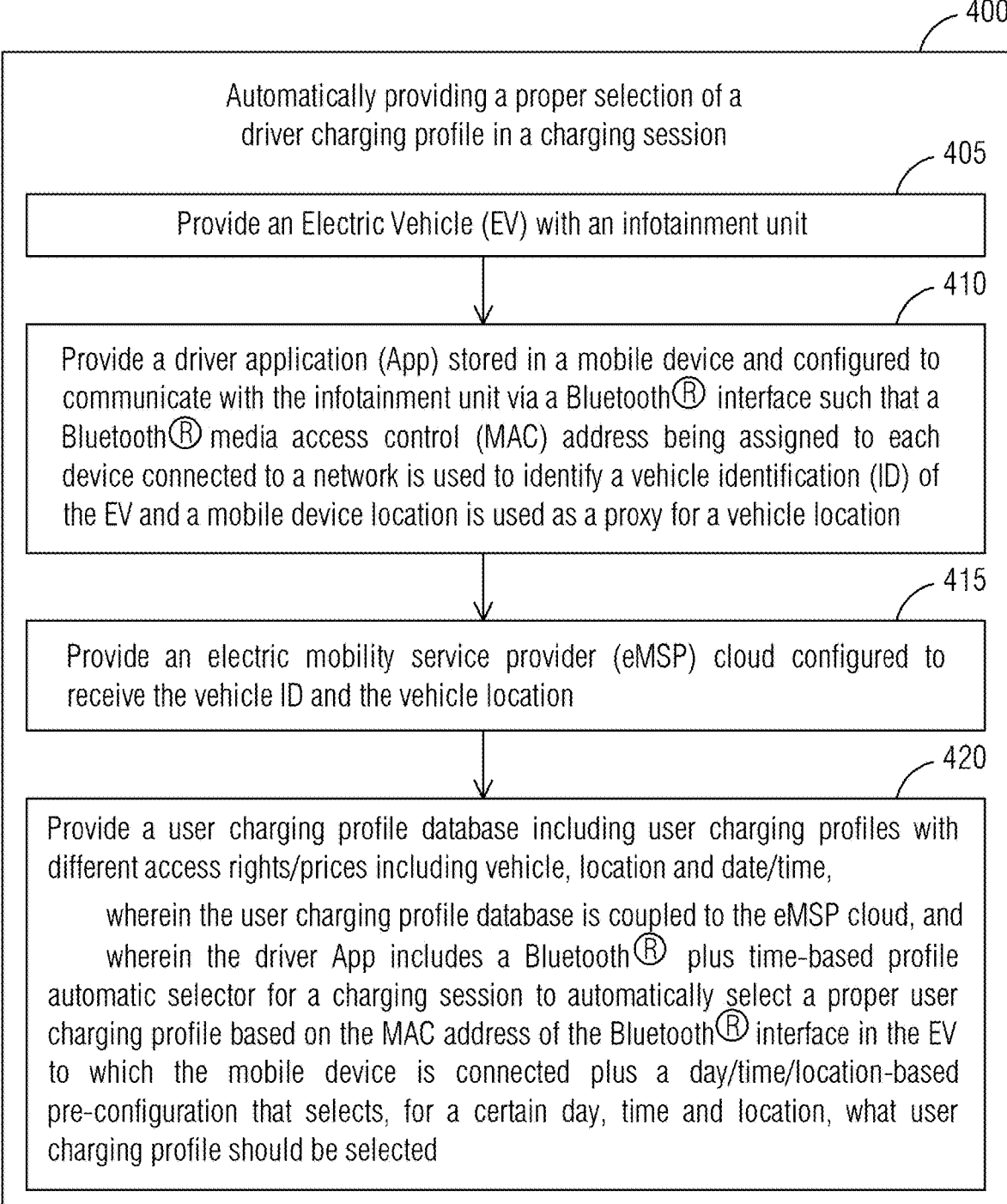

400

Automatically providing a proper selection of a
driver charging profile in a charging session

405

Provide an Electric Vehicle (EV) with an infotainment unit

410

Provide a driver application (App) stored in a mobile device and configured to communicate with the infotainment unit via a Bluetooth® interface such that a Bluetooth® media access control (MAC) address being assigned to each device connected to a network is used to identify a vehicle identification (ID) of the EV and a mobile device location is used as a proxy for a vehicle location

415

Provide an electric mobility service provider (eMSP) cloud configured to receive the vehicle ID and the vehicle location

420

Provide a user charging profile database including user charging profiles with different access rights/prices including vehicle, location and date/time, wherein the user charging profile database is coupled to the eMSP cloud, and
wherein the driver App includes a Bluetooth® plus time-based profile automatic selector for a charging session to automatically select a proper user charging profile based on the MAC address of the Bluetooth® interface in the EV to which the mobile device is connected plus a day/time/location-based pre-configuration that selects, for a certain day, time and location, what user charging profile should be selected

FIG. 4

ELECTRIC VEHICLE (EV) DRIVER APPLICATION (APP) TO IDENTIFY A DRIVER CHARGING PROFILE FOR AUTOMATIC SELECTION IN A CHARGING SESSION

BACKGROUND

1. Field

Aspects of the present disclosure generally relate to an Electric Vehicle (EV) driver application (App) that uses Bluetooth® to identify a Bluetooth® and time/location-based driver charging profile for its automatic selection in a charging session.

2. Description of the Related Art

Drivers may have access to more than one vehicle, one for work purposes, and another for private purposes. In addition to this, even when using a single vehicle, drivers may be reimbursed differently for charging their vehicles in relation to work trips vs personal trips. To address this, driver apps typically allow drivers to select a work vs personal profile before charging. This is a manual task, which either requires the driver to select a profile before charging, or that uses a previously selected profile for charging, which may be the incorrect profile at that time, with that vehicle, causing billing errors.

Drivers were forced to pre-select manually the relevant profile before routing to the proper station and charging.

Therefore, a system is then needed to provide a proper selection of a driver charging profile in a charging session.

SUMMARY

Briefly described, aspects of the present disclosure relate to an Electric Vehicle (EV) driver application (App) that uses Bluetooth® to identify a Bluetooth® and time/location-based driver charging profile for its automatic selection in a charging session. The idea to use Bluetooth to identify a vehicle. The driver does not have to do anything on every charging session, given the pre-configuration. The Bluetooth+time-based profile selection automatically selects a proper profile based on a MAC address of a Bluetooth interface in a vehicle to which a phone is connected, plus a day/time/location-based pre-configuration that selects, for a certain day, time and location, what charging profile should be selected. Automated selection allows not only charging with the proper price (as employees vs individuals typically have different pricing agreements), but mapping to charging stations/charging points to which the driver has rights, given the chosen profile. After the conclusion of the charging session, the driver is given the opportunity to confirm that the profile chosen was the correct one, or do nothing or change it to another one.

In accordance with one illustrative embodiment of the present disclosure, a system comprises an Electric Vehicle (EV) with an infotainment unit, a driver application (App) stored in a mobile device and configured to communicate with the infotainment unit via a Bluetooth® interface such that a Bluetooth® media access control (MAC) address (or Bluetooth® address) being assigned to each device connected to a network is used to identify a vehicle identification (ID) of the EV and a mobile device location is used as a proxy for a vehicle location, an electric mobility service provider (eMSP) cloud configured to receive the vehicle ID and the vehicle location and a user charging profile database including user charging profiles with different access rights/prices including vehicle, location and date/time, wherein the user charging profile database is coupled to the eMSP cloud. The driver App includes a Bluetooth® plus time-based profile automatic selector for a charging session to automatically select a proper user charging profile based on the MAC address of the Bluetooth® interface in the EV to which the mobile device is connected plus a day/time/location-based pre-configuration that selects, for a certain day, time and location, what user charging profile should be selected.

In accordance with one illustrative embodiment of the present disclosure, a method is provided which comprises providing an Electric Vehicle (EV) with an infotainment unit, providing a driver application (App) stored in a mobile device and configured to communicate with the infotainment unit via a Bluetooth® interface such that a Bluetooth® media access control (MAC) address (or Bluetooth® address) being assigned to each device connected to a network is used to identify a vehicle identification (ID) of the EV and a mobile device location is used as a proxy for a vehicle location, providing an electric mobility service provider (eMSP) cloud configured to receive the vehicle ID and the vehicle location and providing a user charging profile database including user charging profiles with different access rights/prices including vehicle, location and date/time, wherein the user charging profile database is coupled to the eMSP cloud. The driver App includes a Bluetooth® plus time-based profile automatic selector for a charging session to automatically select a proper user charging profile based on the MAC address of the Bluetooth® interface in the EV to which the mobile device is connected plus a day/time/location-based pre-configuration that selects, for a certain day, time and location, what user charging profile should be selected.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 illustrates a flow chart of a method of automatically providing a proper selection of a driver charging profile in a charging session in accordance with an embodiment of the present disclosure.

DETAILED DESCRIPTION

Figure 1:
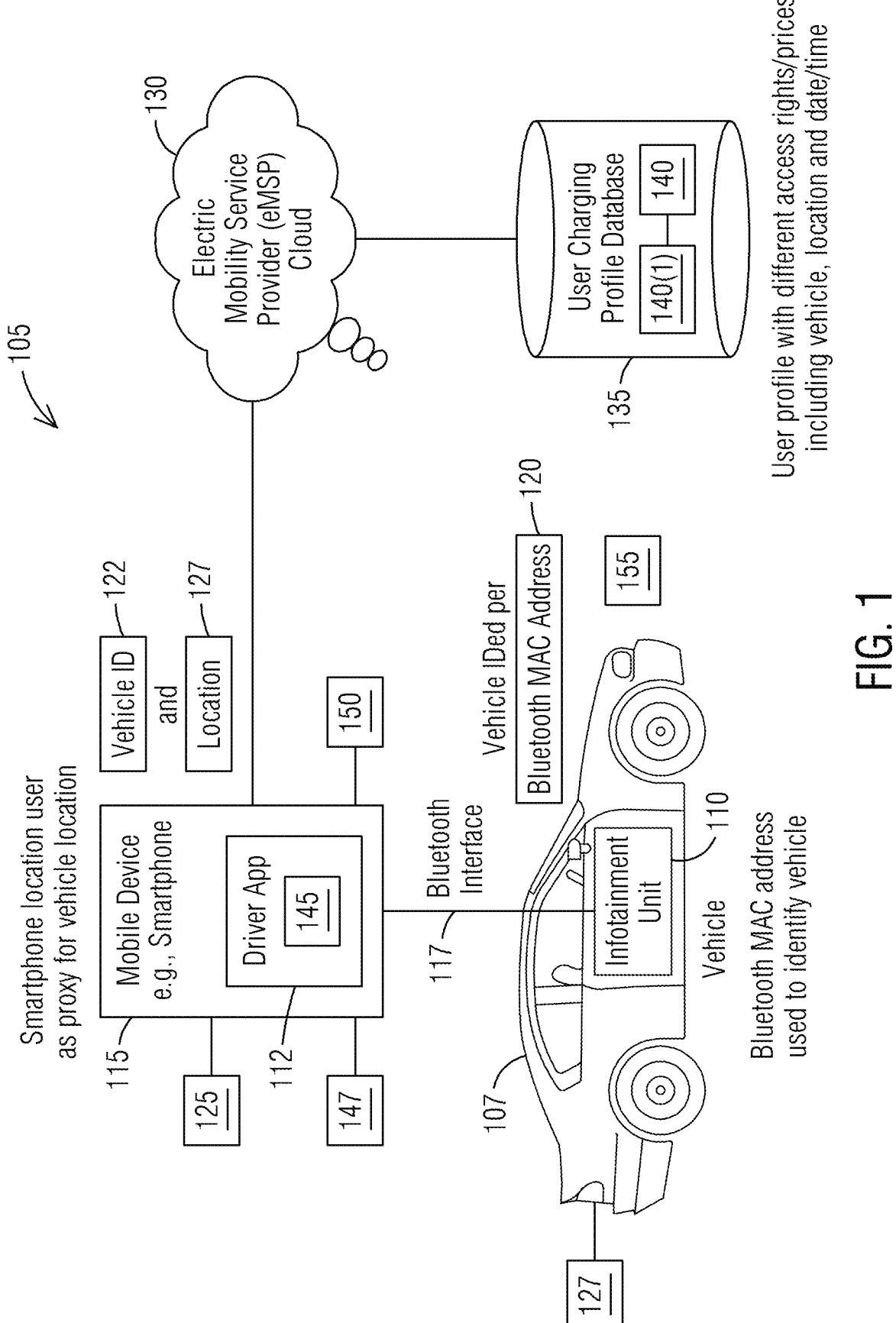
FIG. 1 illustrates a system to automatically provide a proper selection of a driver charging profile in a charging session in accordance with an embodiment of the present disclosure.

Various technologies pertain to systems and methods that automatically provide a proper selection of a driver charging profile in a charging session. A system including an Electric Vehicle (EV) driver application (App) uses Bluetooth® to identify a Bluetooth® and time/location-based driver charging profile for its automatic selection in a charging session. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present disclosure, they are explained hereinafter with reference to implementation in illustrative embodiments. In particular, they are described in the context of automatically providing a proper selection of a driver charging profile in a charging session. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

These and other embodiments of the system are provided for automatically providing a proper selection of a driver charging profile in a charging session according to the present disclosure are described below with reference to FIG. 1 herein. The drawing is not necessarily drawn to scale.

Consistent with an embodiment of the present disclosure, FIG. 1 represents a system 105 for automatically providing a proper selection of a driver charging profile in a charging session in accordance with an embodiment of the present disclosure. The system 105 comprises an Electric Vehicle (EV) 107 with an infotainment unit 110. Automotive infotainment is an in-car system that combines entertainment such as radio and music playing with driving information, including navigation and vehicle settings.

The term electric vehicle ("EV"), as used herein, refers to a motorized vehicle deriving locomotive power, either full-time or part-time, from an electric system on board the motorized vehicle. By way of non-limiting examples, an EV may be an electrically powered passenger vehicle for road use; an electric scooter; an electric fork lift; a cargo-carrying vehicle powered, full-time or part-time, by electricity; an off-road electrically powered vehicle; an electrically powered watercraft; etc.

The system 105 further comprises a driver application (App) 112. The driver application (App) 112 or an EV charging app enables EV drivers to seamlessly control and manage all their EV charging tasks—including searching and filtering the nearest charger locations, route planning and navigation, and charging session initiation—all in a single, all-in-one, mobile app or web portal. The driver App 112 is stored in a mobile device 115 and configured to communicate with the infotainment unit 110 via a Bluetooth® interface 117 such that a Bluetooth@ media access control (MAC) address 120 (or Bluetooth® address has 48 bits, just like an Ethernet MAC address) being assigned to each device connected to a network is used to identify a vehicle identification (ID) 122 of the EV 107 and a mobile device location 125 is used as a proxy for a vehicle location 127.

Offering two radio options, Bluetooth® technology provides developers with a versatile set of full-stack, fit-for-purpose solutions to meet the ever-expanding needs for wireless connectivity. Whether a product streams high-quality audio between a smartphone and speaker, transfers data between a tablet and medical device, or sends messages between thousands of nodes in a building automation solution, the Bluetooth® Low Energy (LE) and Bluetooth® Classic radios are designed to meet the unique needs of developers worldwide.

A MAC address (short for medium access control address) is a unique identifier assigned to a network interface controller (NIC) for use as a network address in communications within a network segment. This use is common in most IEEE 802 networking technologies, including Ethernet, Wi-Fi, and Bluetooth. Within the Open Systems Interconnection (OSI) network model, MAC addresses are used in the medium access control protocol sublayer of the data link layer. As typically represented, MAC addresses are recognizable as six groups of two hexadecimal digits, separated by hyphens, colons, or without a separator. MAC addresses are primarily assigned by device manufacturers, and are therefore often referred to as the burned-in address, or as an Ethernet hardware address, hardware address, or physical address.

The system 105 further comprises an electric mobility service provider (eMSP) cloud 130 configured to receive the vehicle ID 122 and the vehicle location 127. The system 105 further comprises a user charging profile database 135 including user charging profiles 140 with different access rights/prices including vehicle, location and date/time. The user charging profile database 135 is coupled to the eMSP cloud 130.

The driver App 112 includes a Bluetooth® plus time-based profile automatic selector 145 for a charging session 147 to automatically select a proper user charging profile 140(1) based on the MAC address 120 of the Bluetooth® interface 117 in the EV 107 to which the mobile device 115 is connected plus a day/time/location-based pre-configuration 150 that selects, for a certain day, time and location, what user charging profile should be selected.

An automated selection enables not only charging with the proper price (as employees vs individuals typically have different pricing agreements), but mapping to charging stations/charging points to which a driver 155 has rights, given a chosen user charging profile. After the conclusion of the charging session 147, the driver 155 is given the opportunity to confirm that the user charging profile chosen was the correct one, or do nothing or change it to another one. The driver 155 is prompted to associate a vehicle to each user charging profile. The driver 155 is prompted to associate time periods and/or locations to each user charging profile. By default, the driver 155 does not have to do anything on every charging session, given pre-configuration.

The driver App 112 uses only Bluetooth® to identify a vehicle and a user charging profile. The driver 155 is not forced to pre-select manually a relevant user charging profile before routing to a proper station and charging. The driver 155 has access to more than one vehicle, one for work purposes, and another for private purposes. Even when using a single vehicle, the driver 155 may be reimbursed differently for charging their vehicles in relation to work trips vs. personal trips.

The current location of a computing device may correspond or be proximal to the current location of the vehicle. In some embodiments, the current location of the computing device may be conditioned on present connectivity with the vehicle. For example, to ensure that the determined current location of the computing device corresponds or at least approximates the current location of the vehicle, the determined current location may only be determined if Bluetooth connectivity with the vehicle is active. It should be noted that connectivity between the computing device and the vehicle need not be constant. In some embodiments, the computing device and the vehicle are connected for a first time period when determining the current location of the computing device, but are not connected for a second time period when the current location of the computing device is not being determined. See U.S. Pat. No. 11,787,305 for Estimating vehicle state of charge using Bluetooth identification to Daniel Feldman, Amanpreet Kaur. Patented Oct. 17, 2023.

Figure 2:
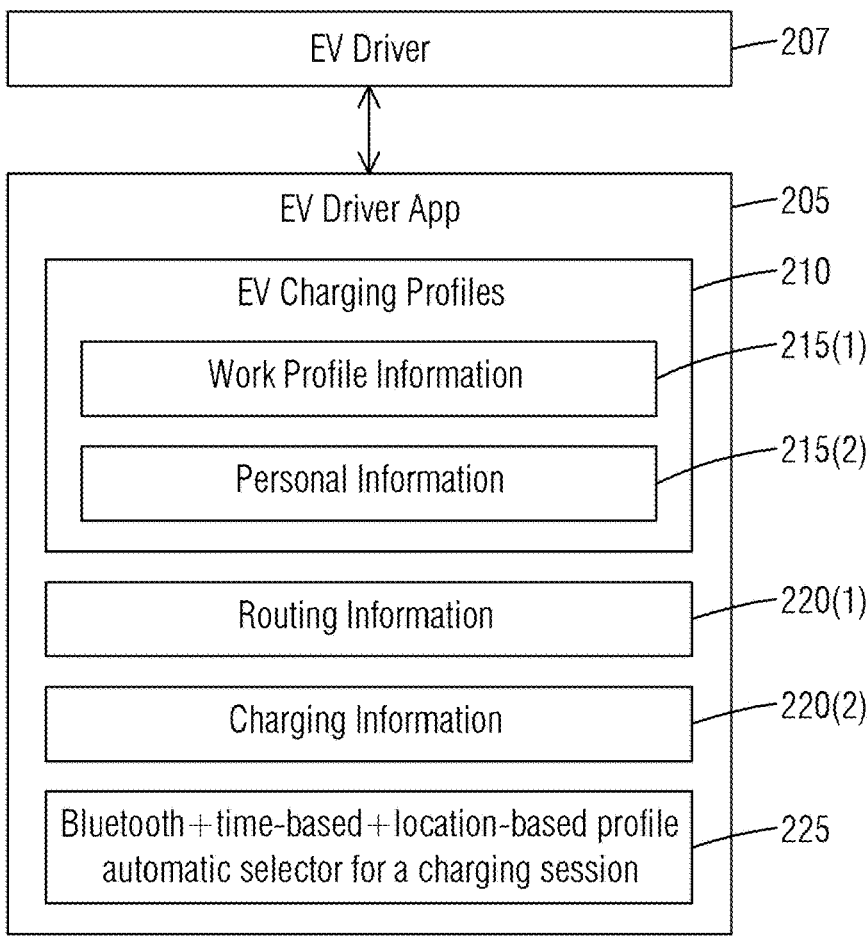
FIG. 2 illustrates a driver application (App) in accordance with an embodiment of the present disclosure.

Referring to FIG. 2, it illustrates an EV driver or charging application (App) 205 for an EV driver 207 that uses an EV charging profile 210 in accordance with an embodiment of the present disclosure. The EV driver or charging App 205 enables EV drivers to seamlessly control and manage all their EV charging tasks-including searching and filtering the nearest charger locations, route planning and navigation, and charging session initiation-all in a single, all-in-one, mobile app or web portal.

Electric Vehicle (EV) charging profiles are important for electric energy distribution network operation, load forecasting, as well as utility grid expansion and planning. EV charging profiles (starting time, charging period, and initial SOC) typically vary significantly between residential and commercial areas, between rural and urban areas, and also between developed and developing areas. A typical individual EV charging profile typically includes its start time, its initial battery state-of-charge (SOC), and its (total) charging time. Charging profiles are sets of power limits with defined time values in seconds. They can be implemented with OCPP-compliant chargers. An EV charging profile is a schedule that limits the power output of an electric vehicle (EV) charger.

The EV charging profile 210 includes work profile information 215(1) and personal profile information 215(2). The EV driver or charging App 205 includes routing info 220(1) and charging info 220(2). The EV driver or charging App 205 further includes a Bluetooth+time-based+location-based profile automatic selector 225 for a charging session.

Figure 3:
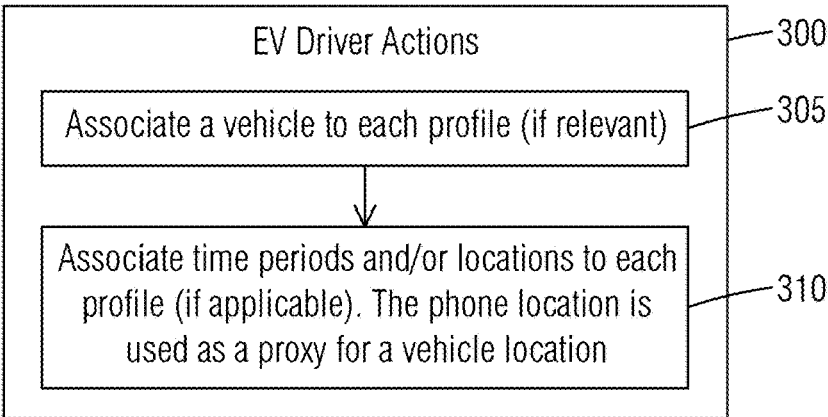
FIG. 3 illustrates a flow chart of a method of driver actions in accordance with an embodiment of the present disclosure.

Turning now to FIG. 3, it illustrates a flow chart of a method 300 of EV driver actions in accordance with an embodiment of the present disclosure. The only things an EV driver needs to do are: a) a step 305 to associate a vehicle to each profile (if relevant) b) a step 310 to associate time periods and/or locations to each profile (if applicable) The phone location is used as a proxy for a vehicle location.

FIG. 4 illustrates a flow chart of a method 400 of automatically providing a proper selection of a driver charging profile in a charging session in accordance with an embodiment of the present disclosure. Reference is made to the elements and features described in FIGS. 1-3. It should be appreciated that some steps are not required to be performed in any particular order, and that some steps are optional.

The method 400 comprises a step 405 of providing an Electric Vehicle (EV) with an infotainment unit. The method 400 further comprises a step 410 of providing a driver application (App) stored in a mobile device and configured to communicate with the infotainment unit via a Bluetooth® interface such that a Bluetooth® media access control (MAC) address being assigned to each device connected to a network is used to identify a vehicle identification (ID) of the EV and a mobile device location is used as a proxy for a vehicle location.

The method 400 further comprises a step 415 of providing an electric mobility service provider (eMSP) cloud configured to receive the vehicle ID and the vehicle location. The method 400 further comprises a step 420 of providing a user charging profile database including user charging profiles with different access rights/prices including vehicle, location and date/time, wherein the user charging profile database is coupled to the eMSP cloud. The driver App includes a Bluetooth® plus time-based profile automatic selector for a charging session to automatically select a proper user charging profile based on the MAC address of the Bluetooth® interface in the EV to which the mobile device is connected plus a day/time/location-based pre-configuration that selects, for a certain day, time and location, what user charging profile should be selected.

While a Bluetooth®-based system is described here a range of one or more other systems are also contemplated by the present disclosure. For example, other short-range communication protocol based systems may be implemented based on one or more features presented above without deviating from the spirit of the present disclosure.

The techniques described herein can be particularly useful for a Bluetooth+time-based+location-based profile automatic selector. While particular embodiments are described in terms of time-based, location-based, the techniques described herein are not limited to such specific parameters but can also be used with other number of parameters.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the disclosure has been described with reference to specific embodiments. However, one of ordinary skill in the art appreciates that various modifications and changes can be made without departing from the scope of the disclosure. Accordingly, the specification and figures are to be regarded in an illustrative rather than a restrictive sense, and all such modifications are intended to be included within the scope of disclosure.

Although the disclosure has been described with respect to specific embodiments thereof, these embodiments are merely illustrative, and not restrictive of the disclosure. The description herein of illustrated embodiments of the disclosure is not intended to be exhaustive or to limit the disclosure to the precise forms disclosed herein (and in particular, the inclusion of any particular embodiment, feature or function is not intended to limit the scope of the disclosure to such embodiment, feature or function). Rather, the description is intended to describe illustrative embodiments, features and functions in order to provide a person of ordinary skill in the art context to understand the disclosure without limiting the disclosure to any particularly described embodiment, feature or function. While specific embodiments of, and examples for, the disclosure are described herein for illustrative purposes only, various equivalent modifications are possible within the spirit and scope of the disclosure, as those skilled in the relevant art will recognize and appreciate. As indicated, these modifications may be made to the disclosure in light of the foregoing description of illustrated embodiments of the disclosure and are to be included within the spirit and scope of the disclosure. Thus, while the disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope and spirit of the disclosure as set forth. Therefore, many modifications may be made to adapt a particular situation or material to the essential scope and spirit of the disclosure.

Respective appearances of the phrases "in one embodiment," "in an embodiment," or "in a specific embodiment" or similar terminology in various places throughout this necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the disclosure.

In the description herein, numerous specific details are provided, such as examples of components and/or methods, to provide a thorough understanding of embodiments of the disclosure. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the disclosure. While the disclosure may be illustrated by using a particular embodiment, this is not and does not limit the disclosure to any particular embodiment and a person of ordinary skill in the art will recognize that additional embodiments are readily understandable and are a part of this disclosure.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A system comprising:

an Electric Vehicle (EV) with an infotainment unit;

a driver application (App) stored in a mobile device and configured to communicate with the infotainment unit via a Bluetooth interface such that a Bluetooth media access control (MAC) address being assigned to each device connected to a network is used to identify a vehicle identification (ID) of the EV and a mobile device location is used as a proxy for a vehicle location;

an electric mobility service provider (eMSP)-cloud configured to receive the vehicle ID and the vehicle location; and a user charging profile database including user charging profiles with different access rights and prices including vehicle, location, date and time, wherein the user charging profile database is coupled to the eMSP-cloud, and wherein a Bluetooth plus time-based profile automatic selector automatically selects a user charging profile without requiring manual driver input by matching the MAC address of the Bluetooth interface to a pre-associated vehicle and applying stored day/time/location-based rules that map specific combinations of day, time and location to corresponding user charging profiles having different access rights and pricing.

2. The system of claim 1, wherein an automated selection enables charging with a price associated with a chosen user charging profile and mapping to charging stations/charging points to which a driver has rights, given the chosen user charging profile.

3. The system of claim 2, wherein after conclusion of a charging session, the driver is given an opportunity to confirm that the chosen user charging profile was correct or change the user charging profile.

4. The system of claim 3, wherein the driver is prompted to associate a vehicle to each user charging profile.

5. The system of claim 4, wherein the driver is prompted to associate time periods and/or locations to each user charging profile.

6. The system of claim 1, wherein the driver App uses only Bluetooth to identify a vehicle and a user charging profile.

7. The system of claim 1, wherein the driver is not forced to pre-select manually a relevant user charging profile before routing to a charging station corresponding to a selected user charging profile and charging.

8. A method comprising:

providing an Electric Vehicle (EV) with an infotainment unit;

providing a driver application (App) stored in a mobile device and configured to communicate with the infotainment unit via a Bluetooth interface such that a Bluetooth media access control (MAC) address being assigned to each device connected to a network is used to identify a vehicle identification (ID) of the EV and a mobile device location is used as a proxy for a vehicle location;

providing an electric mobility service provider (eMSP)-cloud configured to receive the vehicle ID and the vehicle location; and providing a user charging profile database including user charging profiles with different access rights and prices including vehicle, location, date and time, wherein the user charging profile database is coupled to the eMSP-cloud, and wherein a Bluetooth plus time-based profile automatic selector automatically selects a user charging profile without requiring manual driver input by matching the MAC address of the Bluetooth interface to a pre-associated vehicle and applying stored day/time/location-based rules that map specific combinations of day, time and location to corresponding user charging profiles having different access rights and pricing.

9. The method of claim 8, wherein an automated selection enables charging with a price associated with a chosen user profile and mapping to charging stations/charging points to which a driver has rights, given the chosen user charging profile.

10. The method of claim 9, wherein after conclusion of a charging session, the driver is given an opportunity to confirm that the chosen user charging profile was correct or change the user charging profile.

11. The method of claim 10, wherein the driver is prompted to associate a vehicle to each user charging profile.

12. The method of claim 11, wherein the driver is prompted to associate time periods and/or locations to each user charging profile.

13. The method of claim 8, wherein the driver App uses only Bluetooth to identify a vehicle and a user charging profile.

14. The method of claim 8, wherein the driver is not forced to pre-select manually a relevant user charging profile before routing to a charging station corresponding to a selected user charging profile and charging.

* * * * *